United States Patent
Quintin, Jr.

(10) Patent No.: US 7,748,146 B2
(45) Date of Patent: Jul. 6, 2010

(54) METHOD FOR CONFIGURING A SHELLFISH DREDGE

(76) Inventor: Thomas Quintin, Jr., 119 Nellie Rd., New Bedford, MA (US) 02740

( * ) Notice: Subject to any disclaimer, the term of this patent is extended or adjusted under 35 U.S.C. 154(b) by 0 days.

(21) Appl. No.: 11/946,904

(22) Filed: Nov. 29, 2007

(65) Prior Publication Data
US 2009/0139117 A1    Jun. 4, 2009

(51) Int. Cl.
*A01K 73/00* (2006.01)
(52) U.S. Cl. .............. 37/315; 37/316; 37/195; 43/7; 43/9.1; 43/9.4
(58) Field of Classification Search .......... 37/315, 37/316, 341, 195; 43/4.5, 9.4, 7, 9.1, 9.5
See application file for complete search history.

(56) References Cited

U.S. PATENT DOCUMENTS

| | | | |
|---|---|---|---|
| 373,646 A * | 11/1887 | Cook ................... | 37/316 |
| 589,047 A * | 8/1897 | Thomas ............... | 43/9.2 |
| 2,647,339 A | 8/1953 | Donnell | |
| 2,684,549 A * | 7/1954 | Olden ................. | 43/9.4 |
| 3,084,309 A | 4/1963 | Wiegardt, Jr. | |
| 3,087,293 A * | 4/1963 | Cassidy .............. | 56/8 |
| 3,113,389 A | 12/1963 | Vuskovich | |
| 3,608,217 A | 9/1971 | Voisin, Sr. | |
| 4,052,800 A * | 10/1977 | Fuhrboter et al. .... | 37/314 |
| 4,112,602 A | 9/1978 | Kato et al. | |
| 4,216,595 A | 8/1980 | Kato et al. | |
| 4,328,629 A | 5/1982 | Bruce, Jr. et al. | |
| 4,349,972 A | 9/1982 | Bruce, Jr. et al. | |
| 4,446,637 A * | 5/1984 | Ferreira ............... | 37/316 |
| 4,646,448 A | 3/1987 | Voisin | |
| 4,697,373 A | 10/1987 | May | |
| 4,852,337 A | 8/1989 | Peterson | |
| 5,024,009 A * | 6/1991 | Kirkman ............... | 37/316 |
| 5,482,485 A | 1/1996 | Ball | |
| 6,261,142 B1 | 7/2001 | Fiotakis | |
| 6,672,039 B1 | 1/2004 | Shonnard | |
| 6,962,123 B1 | 11/2005 | Tunks | |

* cited by examiner

*Primary Examiner*—Thomas A Beach
*Assistant Examiner*—Matthew R Buck
(74) *Attorney, Agent, or Firm*—Partridge Snow & Hahn LLP

(57) ABSTRACT

A method for configuring a shellfish dredge is described. In an embodiment of the invention, a bag on a shellfish dredge has a front side and a back side and is attached to a tow. The front side of the bag has a pair of end peaks, one or more central peaks and an open area for catching shellfish. The end peaks are attached to the tow and the central peaks are attached to vertical chains connected to the tow. The bag is of a depth to catch and contain shellfish.

8 Claims, 4 Drawing Sheets

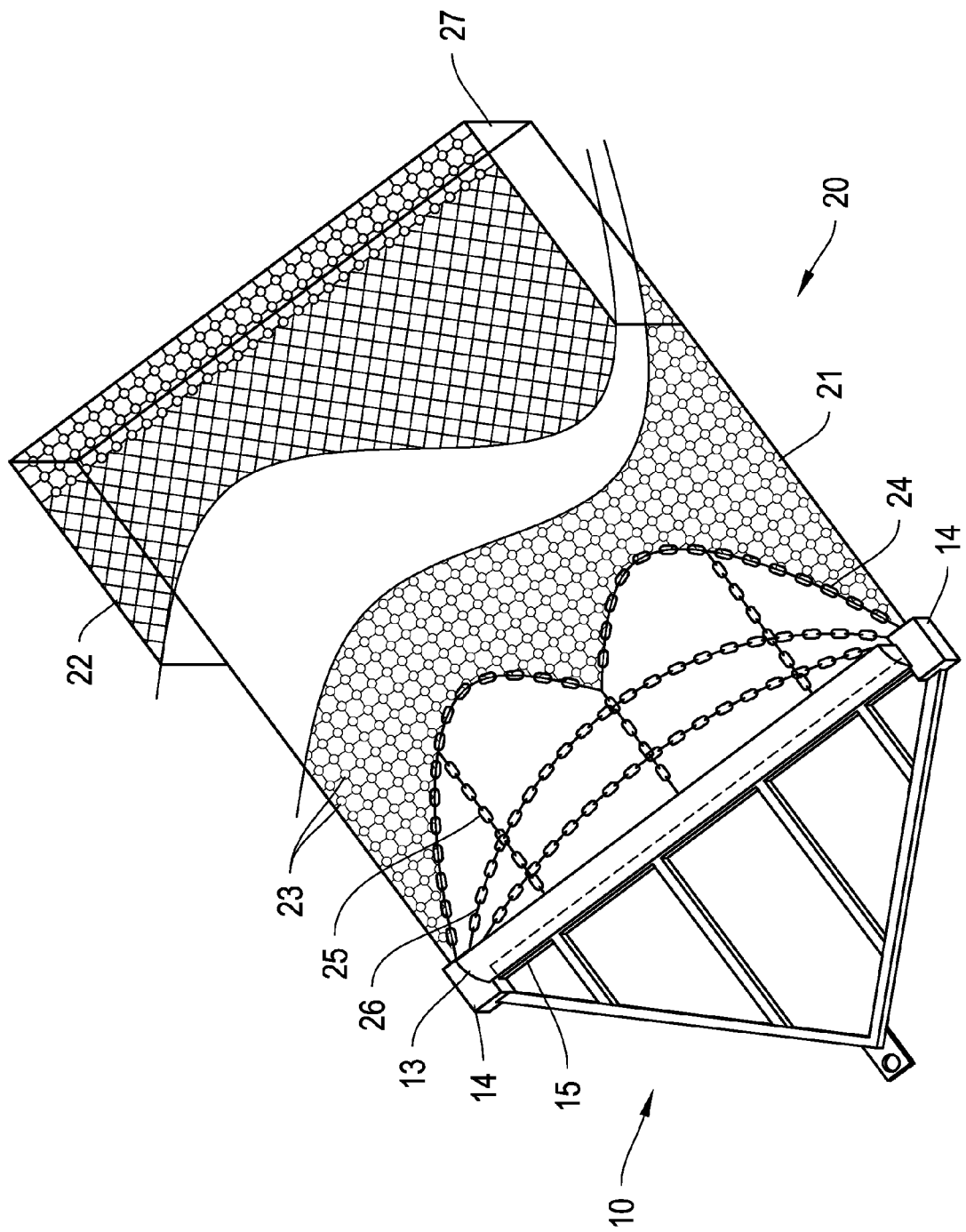

METHOD FOR CONFIGURING A SHELLFISH DREDGE

FIELD OF THE INVENTION

The present invention relates to the field of collecting shellfish and more specifically to a method for configuring a shellfish dredge.

BACKGROUND OF THE INVENTION

Fishing for shellfish, like scallops, has traditionally been done by using a shellfish dredge. Shellfish dredge technology has remained relatively unchanged for many decades. A shellfish dredge traditionally consists of a metal towing mechanism connected to a bag. The towing mechanism runs along the ocean floor and the shellfish, which rest on the ocean floor, are captured in the bag. The bag is similar in shape to a purse and has a deep-scooped ocean-floor side that runs along the ocean floor, a pocket side that creates the pocket space for the shellfish to lie and a side panel connecting the ocean-floor side to the pocket side. The bag has a scooped metal chain on the top perimeter of the ocean-floor side, which is supposed to apply additional pressure to the ocean floor, keeping the bag in constant and full contact with the ocean floor. However, in practice, only the endpoints of the scooped chain, where the bag is attached to the towing mechanism, come in full contact with the ocean floor. These portions often become worn out quickly and the entire chain needs to be replaced. The remaining portion of the chain does not get worn out and remains in better condition, but still needs to be replaced due to the worn out endpoints.

The worn out endpoint sections of the scooped chain also correspond to the sections of the bag that are actually catching a large majority of the shellfish. The region where the bag and chain connect to the towing mechanism creates a triangular shape and comes to a peak at the points of attachment. During use, shellfish are predominantly collected in these peak regions of the bag, with the remaining bag being primarily empty. The entire center region is not in constant and full contact with the ocean floor because it does not have the additional pressure created by the peaks and the towing mechanism and thus is not capturing all the shellfish. The current method of configuring a shellfish dredge is only capturing in the bag a small percentage of the shellfish capable of being caught.

The opening of the bag, the capture area, represents the area where the shellfish enter and is traditionally shaped like a semi-circle. The top edges of the circle, the end peaks, are connected to the towing mechanism.

In recent years, the environmental impact of shellfish dredging has come under more scrutiny. Environmental regulations address the need to keep protected sea-animals from inadvertently getting caught in the shellfish dredge bag. These regulations often require additional chains and netting to be placed on the bag. Additionally, due to the desire to preserve the ocean bottom, there is an environmental advantage in decreasing the bottom time, the amount of time that a dredge spends on the ocean floor. At the same time, there is an economic and consumer need to preserve or increase the shellfish yields.

SUMMARY OF THE INVENTION

Embodiments of the invention are concerned with a method for improving shellfish yields, decreasing the time needed on the ocean bottom and maximizing the use of the metal chains, while still conforming to environmental needs and regulations. A traditional bag is reconfigured to create an additional section for collecting shellfish. This can be done while still complying with environmental regulations. By reconfiguring the bag to have an additional section, additional regions of force and pressure are created for catching the shellfish. This increase in force is done without significantly reducing the shellfish capture area of the bag as a whole, and therefore leads to an increase in shellfish that are caught.

The bag can also be configured to have multiple additional sections. The additional sections create more regions for shellfish to enter. By using more of the bag to catch shellfish, more of the scooped metal chain will be used to catch shellfish. The bag can further be configured to create a wider capture area. The overall configuration of the bag can be optimized to deal with the availability of shellfish and environmental regulations in place with regards to bottom time and the amount of shellfish that are allowed to be collected.

It is an object of the invention to increase the shellfish caught in the bag of a shellfish dredge. It is a further object of the invention to maximize use of the bag area. It is a further object of the invention to more optimally use the scooped metal chain on the front side of the bag. It is a further object of the invention to be able to reduce bottom time without reducing corresponding shellfish yields.

In order to improve performance of the chain bag, reduce ocean bottom time and improve use of the scooped chain, the inventor has come up with a method of modifying and configuring a shellfish dredge bag.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

FIG. 2a illustrates a profile top view of an embodiment of the invention, as used on ocean floor.

DETAILED DESCRIPTION

A method for configuring a shellfish dredge is described. In the following description, for purposes of explanation, numerous specific details are set forth to provide a thorough understanding of the present invention. However, persons having ordinary skill in the relevant arts will appreciate that these specific details may not be needed to practice the present invention.

Figure 1:
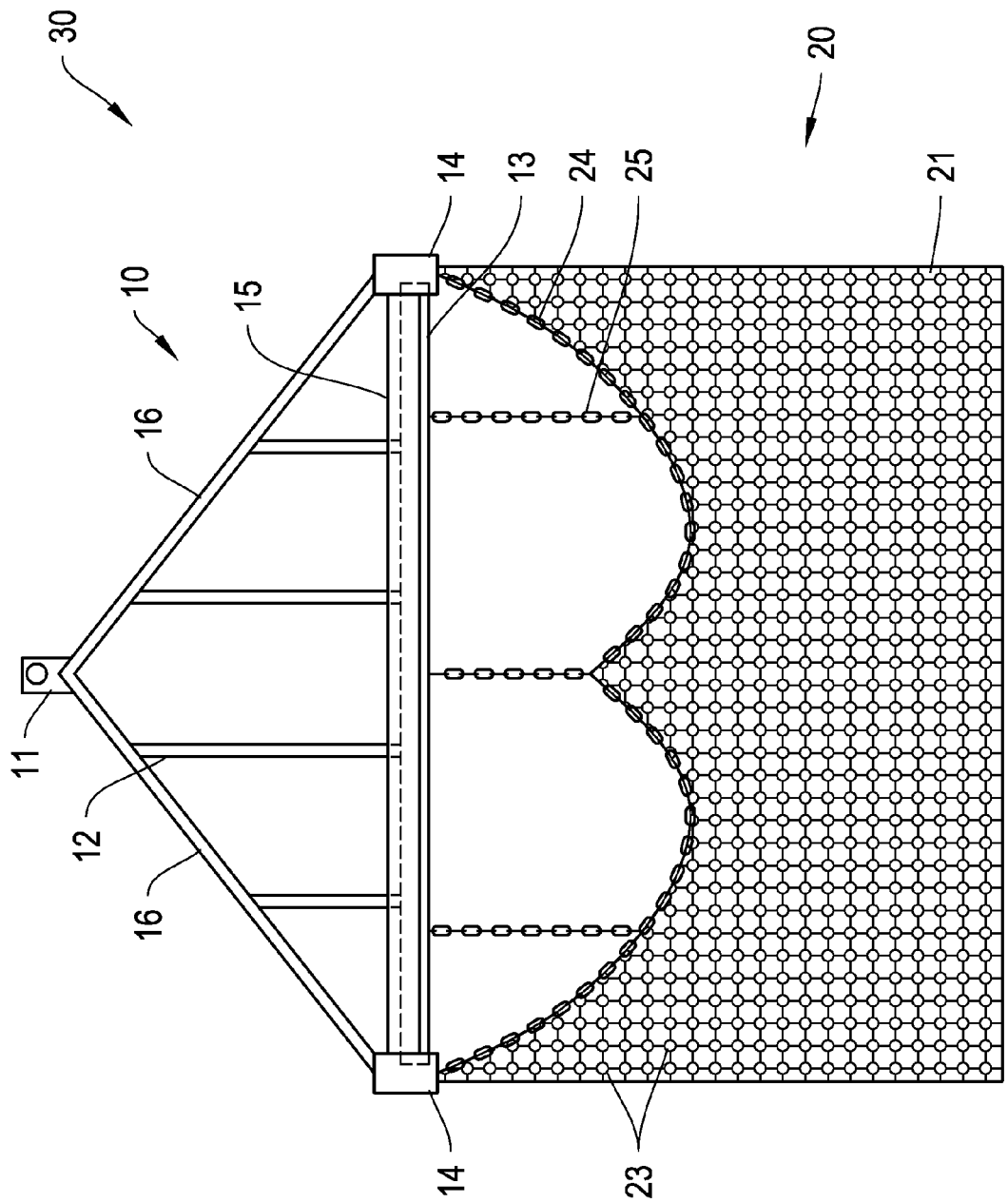
FIG. 1 illustrates a plan view of the ocean-floor side of an embodiment of the invention.

As disclosed in FIG. 1 and FIG. 2, there is a shellfish dredge 30, which is used to catch shellfish situated along the ocean floor. The shellfish dredge is comprised of a towing frame 10 and a bag 20. The towing frame is made up of a strong metal, such as steel. It has a hook 11, which allows the dredge 30 to be towed at the ocean surface. The towing frame 10 has a cutting bar 15 and a pair of angled frame bars 16. The towing frame 10 has one or more support bars 12 for added strength. The cutting bar 15, angled frame bars 16 and support bars 12 make up the frame and structure of the towing mechanism 10. It is appreciated that additional braces and bars can be added to the towing frame 10 for increased strength and support. The front side of the cutting bar 15 runs along the ocean floor and the back side of the cutting bar 15 is attached to the angled frame bars 16. The angled frame bars 16 are attached to the cutting bar 15 and the hook 11. It is appreciated that an additional support mechanism may be located at hook 11 to assist in securing the angled frame bars 16. The support bars 12 are connected between the floor bar 15 and the angled frame bars 16.

A water pressure plate 13 is attached as the cutting bar 15, on the side that does not run along the ocean floor. The water pressure plate 13 is sloped and angled in shape and is used to direct the ocean water in such a manner as to keep the shellfish dredge 30 on the ocean floor.

There are a pair of floor plates 14, attached at the endpoints of the cutting bar 15. The floor plates 14 and cutting bar are in contact with the ocean floor and are used to attach the bag 20 to the towing mechanism 10.

Shellfish are caught and stored in the bag 20. The bag 20 is comprised of an ocean-floor side 21, a pocket side 22 and a side panel 27. The pocket side 22 is attached to the pressure plate 13. The pocket side 22 and side panel 27 can be made up of a netting material, capable of keeping shellfish from leaving the bag. Neither the pocket side 22 nor the side panel 27 are meant to come in contact with the ocean floor. The purpose of the pocket side 22 and side panel 27 are to create the space needed to store caught shellfish.

The ocean-floor side 21 comes in contact with the ocean floor. It is made up of a connection of metal rings and links 23. The metal rings are circular in shape. It is appreciated that the size of the rings effects the size of the shellfish that the bag is capable of holding. It is also appreciated that environmental regulations may specify the size of the rings. The rings are linked together in such a manner as to create the shape of the front side 21. The metal rings and links 23 are joined together such that a pair of end peaks 28 are created, which can be attached to the floor plates 14. The metal rings and links 23 are joined together such that an open area is created between the end peaks 28, that is capable of capturing the shellfish. The upper portion of the ocean-floor side 21 has a detachable scoop chain 24 attached along the top perimeter. The endpoints of the ocean-floor side 21 and scoop chain 24 are securely attached to the floor plates 14.

Figure 2B:
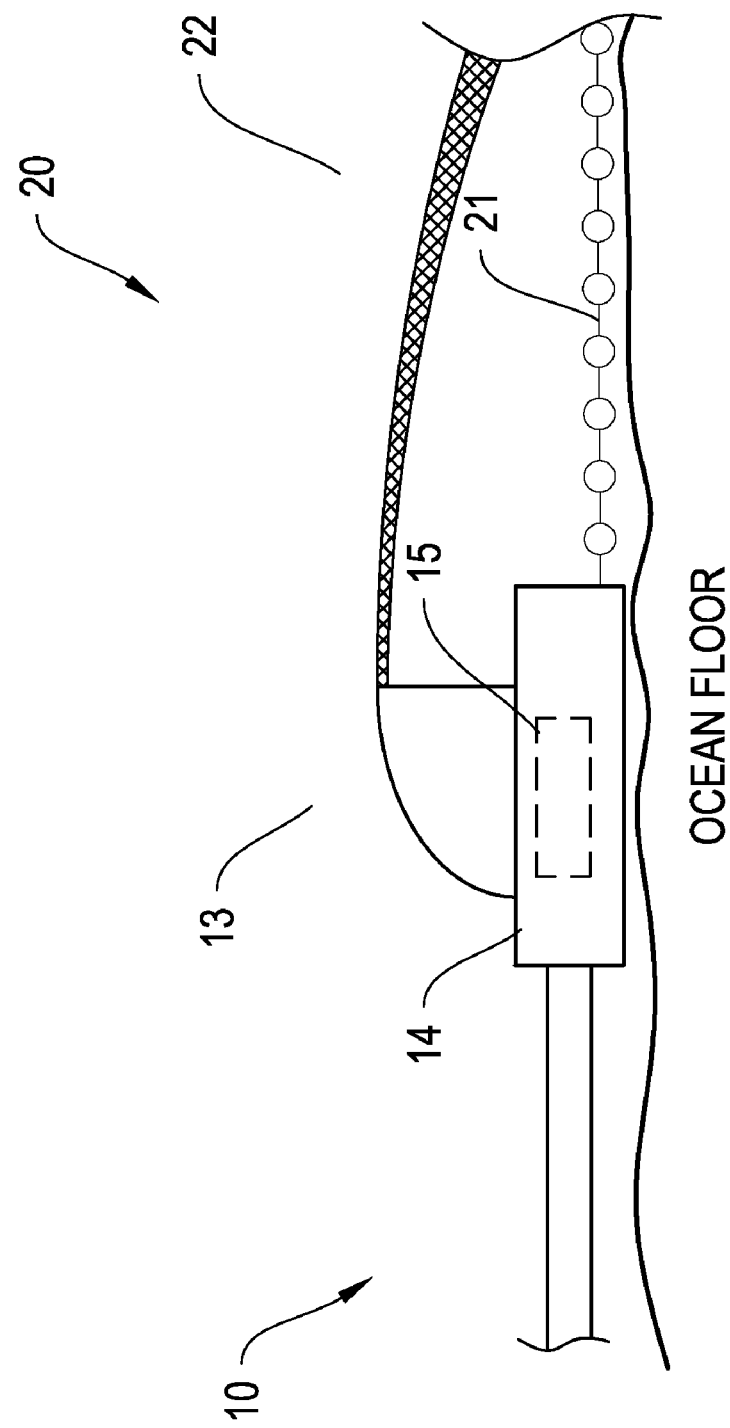
FIG. 2b illustrates a side view of an embodiment of the invention, where towing frame meets the bag.
Figure 3:
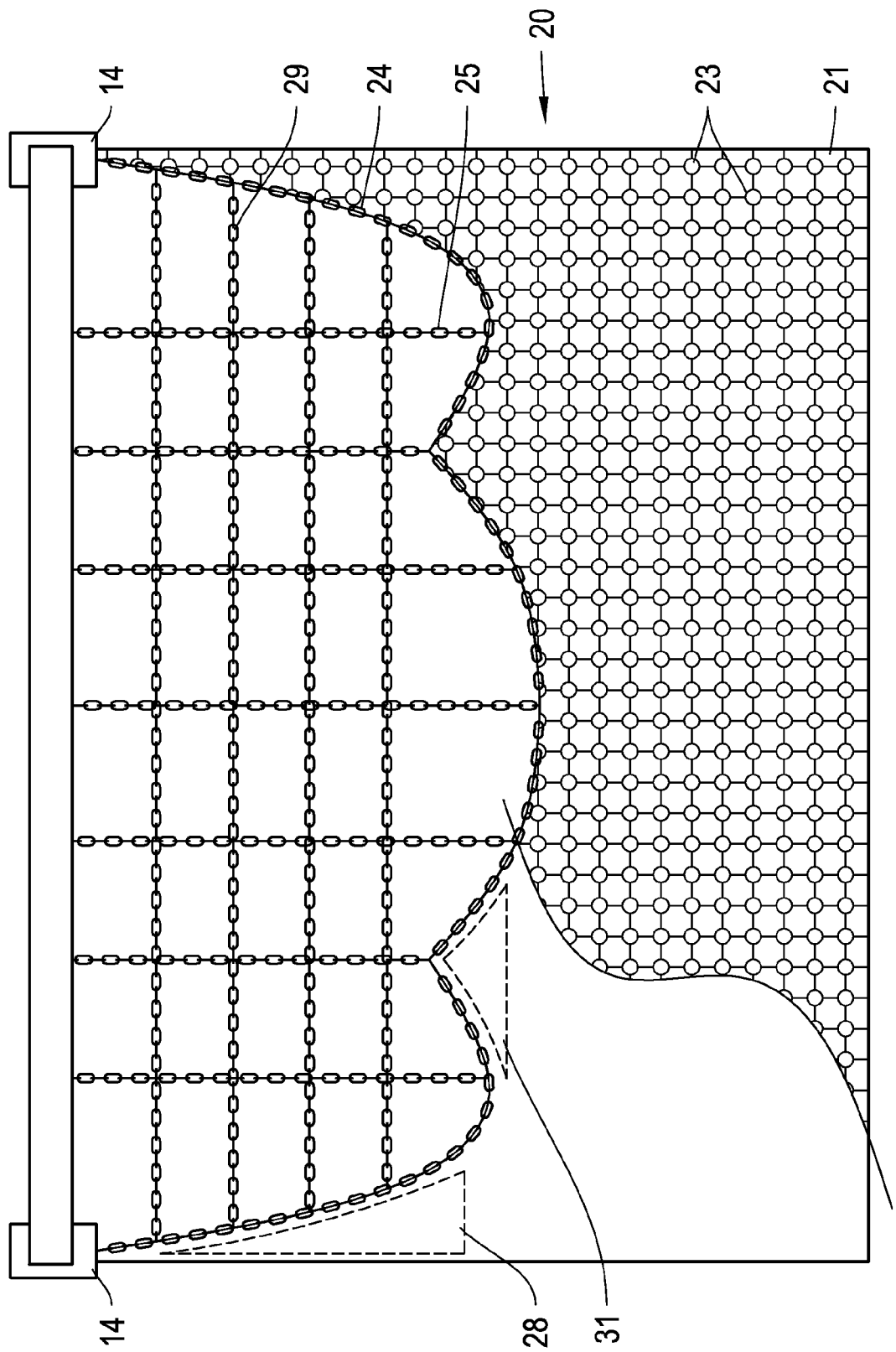
FIG. 3 illustrates a plan view example of the ocean-floor side of another embodiment of the invention.

As represented in FIGS. 1, 2a and 3, one or more support chains 25 are connected between the cutting bar 15 and the scoop chain 24. The support chain 25 must remain taut to keep the bag 20 from changing shape or rising off the ocean floor. The length of the vertical chains 25, that is, the distance between the cutting bar 15 and scoop chain 24, can be adjusted by adding or removing chain links, so that the support chain 25 remains taut. The object chains 26 in FIGS. 1 and 2a create a grid-like pattern with the support chains 25 and are securely attached to the towing mechanism 10. The object chains 26 may be attached to the cutting bar 15, the floor plates 14 or an additional support brace that is securely fixed to the towing mechanism 10. The purpose of the grid-like pattern created by the support chains 25 and object chains 26 are to keep large objects from entering the bag 20. The object chains must remain securely attached to the towing mechanism 10 to overcome the force of large objects, such as rocks. The horizontal, animal chains 29 in FIG. 3 are attached to the scoop chain 24 and create a grid-like pattern with the support chains 25. The purpose of the vertical chains 25 and animal chains 29 is to meet environmental regulations to keep larger animals, like turtles, from entering and getting caught in the bag 20.

In an embodiment of the invention, the metal rings and links 23 of the front side 21 are configured such that a central peak 31 is created. This is done by adding additional metal rings and links to the center of the front side 21 in the shape of a triangle. The scoop chain 24 must be attached to conform to the top perimeter of the front side 21. The scoop chain 24 may be adjusted so that it's length can cover the perimeter between the peaks 28. The tip of the central peak 31 is then attached to the support chain 25 that is directly above it. The length of the support chain 25, that is, the distance between the cutting bar 15 and scoop chain 24, must be adjusted so that it remains taut when connected to the central peak 31.

By creating the central peak 31 and attaching it to the support chain 25, additional downward force is created at the central peak 31, allowing more of the scooped chain 24 to run along the ocean floor and allowing the bag 20 to stay in more constant contact with the ocean floor so that more shellfish can be captured. This additional capture region is created without significantly reducing the overall capture area of the bag 20. It is appreciated that the distance between the frame 10 and the central peak 31 should not be too small or allow the central peak 31 to come too close to the cutting bar 15, as that will greatly minimize the capture area of the bag 20. In addition, if the height of the peak is too close to the cutting bar, the ability to securely connect the object chains 26 to the towing mechanism 10 will not be possible.

FIG. 2b shows a side view of the towing frame and bag 20. As the towing frame 10 runs along the ocean floor, it pulls the bag 20 and allow shellfish to be collected in the area between the ocean-floor side 21 and the pocket side 22 of the bag 20.

In another embodiment of the invention, one or more additional central peaks 31 may be created on the ocean-floor side 21. A support chain 25 must be positioned to attach to each additional central peak 31. It is appreciated that having an excessive number of central peaks 31 may reduce the capture area significantly. The one or more additional central peaks 31 do not have to be equal in height to one another.

The ocean-floor side 21 may also be configured such that the end peaks 28 have a steeper incline and thus create a wider capture area for the shellfish. It is appreciated that the ocean-floor side 21 should not be configured to go too low to the bottom of the bag 20 or the ocean-floor side 21 will not be able to contain all of the shellfish.

The above description is included to illustrate embodiments of the present invention and is not meant to limit the scope of the invention. The scope of the invention is to be limited only by the following claims.

What is claimed is:

1. A method for configuring a shellfish bag comprising:
joining together a series of metal rings and links to form an ocean-floor side of said bag, such that said ocean-floor side has sufficient depth to hold contents of said bag and wherein metal rings and links are configured to create a pair of end peaks in the shape of a triangle, a center peak in the shape of a triangle and an open area for capturing shellfish,
securing a single metal chain along top perimeter of ocean floor side of bag;
attaching said ocean-floor side of bag to a pocket side of said bag; and attaching said center peak to a support chain wherein said support chain is connected to a metal towing frame, wherein the length of the support chain from the point of connection at the towing frame to the center peak is such that the support chain supports the shape of said bag and allows center peak to remain in contact with ocean floor, and wherein the distance from the towing frame to the center peak is greater than distance from the towing frame to the end peaks.

2. The method of claim 1, further comprising:
arranging said metal rings and links to create one or more center peaks.

3. A method for configuring a shellfish dredge comprising:
securing a metal cutting bar to a pair of metal angled bars to form a towing frame, wherein said frame also comprises one or more support bars, a pair of plates secured to ends of said cutting bar and one or more support chains attached at said cutting bar;
joining together a series of metal rings and links to create an ocean-floor side of a bag, wherein said metal rings and links are configured such that said ocean-floor side has a sufficient depth to hold contents of said bag and wherein said bag has a pair of end peaks in the shape of a triangle, a center peak in the shape of a triangle, and an open area for capturing shellfish;
attaching a single metal chain to top perimeter of said ocean-floor side of bag;
joining said ocean-floor side of bag to a pocket side of bag;
securing end peaks of ocean-floor side of bag to said pair of plates;
securing pocket side of bag to towing frame such that a pocket is created between ocean-floor side and pocket side when said dredge is positioned along a floor; and
attaching tip of center peak to said support chain,
wherein the length of support chain from point of attachment at towing frame to the center peak is such that the support chain supports the shape of said bag and allows center peak to remain in contact with ocean floor, and wherein the distance from the towing frame to the center peak is greater than distance from the towing frame to the end peaks.

4. The method of claim 3, wherein metal rings and links can be formed to create one or more center peaks.

5. The method of claim 3, wherein metal rings and links can be formed to create steeper end peaks and a wider open area.

6. A method for modifying a shellfish bag comprising:
detaching a metal chain from top perimeter of an ocean-floor side of said bag, wherein said ocean-floor side is made up of metal rings and links and has a pair of end peaks and a single scooped section between said end peaks;
adding metal rings and links to the top of said ocean-floor side of said bag in the shape of a triangle to create a center peak;
extending length of said metal chain so that it equals the top perimeter distance of said front side of said bag; and
re-attaching metal chain to top perimeter of ocean-floor side of said bag, wherein said bag is detachably attached to a towing frame at said end peaks and wherein said center peak is attached to a support chain connected to said towing frame, wherein the distance between the towing frame and the end peaks is less than the distance between the towing frame and the center peak.

7. The method of claim 6, wherein metal rings and links can be formed to create one or more center peaks.

8. The method of claim 6, further comprising removing metal rings and links from the end peaks to create steeper end peaks and a wider open area.

* * * * *